(12) United States Patent
Zhang et al.

(10) Patent No.: US 9,123,923 B2
(45) Date of Patent: Sep. 1, 2015

(54) USE OF POROUS MEMBRANE AND COMPOSITE MEMBRANE THEREOF IN REDOX FLOW ENERGY STORAGE BATTERY

(75) Inventors: Huamin Zhang, Dalian (CN); Xianfeng Li, Dalian (CN); Hongzhang Zhang, Dalian (CN); Dingqin Shi, Dalian (CN)

(73) Assignee: DALIAN INSTITUTE OF CHEMICAL PHYSICS, CHINESE ACADEMY OF SCIENCES, Dalian (CN)

( * ) Notice: Subject to any disclaimer, the term of this patent is extended or adjusted under 35 U.S.C. 154(b) by 94 days.

(21) Appl. No.: 13/991,761

(22) PCT Filed: Jul. 8, 2011

(86) PCT No.: PCT/CN2011/076981
§ 371 (c)(1),
(2), (4) Date: Jun. 5, 2013

(87) PCT Pub. No.: WO2012/075810
PCT Pub. Date: Jun. 14, 2012

(65) Prior Publication Data
US 2013/0252137 A1    Sep. 26, 2013

(30) Foreign Application Priority Data

Dec. 10, 2010  (CN) ............................ 2010 1 0582470
Dec. 10, 2010  (CN) ............................ 2010 1 0584716

(51) Int. Cl.
*H01M 6/04* (2006.01)
*H01M 8/02* (2006.01)
(Continued)

(52) U.S. Cl.
CPC ............. *H01M 8/0293* (2013.01); *C08J 5/22* (2013.01); *C08J 5/2293* (2013.01);
(Continued)

(58) Field of Classification Search
CPC ........ C08J 2327/16; C08J 5/22; C08J 5/2293; H01M 8/0293; H01M 8/1018; H01M 8/1067; H01M 8/1088; H01M 8/188; H01M 8/20; Y02E 60/521; Y02E 60/528
USPC .................................. 429/129, 188, 304, 247
See application file for complete search history.

(56) References Cited

U.S. PATENT DOCUMENTS 4,018,971 A    4/1977  Sheibley et al.
(Continued)

FOREIGN PATENT DOCUMENTS

| JP | 53-13142 A | 2/1978 |
| JP | 10162853 A | 6/1988 |

OTHER PUBLICATIONS

Mohammadi et al., Modification of a Composite Membrane for Redox Flox Battery Applications, Iranian Polymer Journal, vol. 6, No. 1 (1997), pp. 43-51.
(Continued)

*Primary Examiner* — Patrick Ryan
*Assistant Examiner* — Ben Lewis
(74) *Attorney, Agent, or Firm* — Enshan Hong; VLP Law Group LLP

(57) ABSTRACT

Disclosed is use of a porous membrane and a composite membrane thereof in a redox flow batteries, and in particular the use thereof in a vanadium redox flow battery. The membrane can effectively realize the separation of ions with different valence states, and an ion transfer without any ion exchange group. The pore size and structure of the porous membrane can be controlled by filling an inorganic substance or grafting an ion exchange group in the pore, in order to improve the barrier properties of the porous membrane for vanadium ions and to increase proton conductivity.

4 Claims, 5 Drawing Sheets

(51) Int. Cl.
  C08J 5/22    (2006.01)
  H01M 8/10    (2006.01)
  H01M 8/20    (2006.01)
  H01M 8/18    (2006.01)

(52) U.S. Cl.
  CPC ......... *H01M 8/1018* (2013.01); *H01M 8/1067* (2013.01); *H01M 8/1088* (2013.01); *H01M 8/188* (2013.01); *H01M 8/20* (2013.01); *C08J 2327/16* (2013.01); *Y02E 60/521* (2013.01); *Y02E 60/528* (2013.01)

(56) References Cited

U.S. PATENT DOCUMENTS

| | | | |
|---|---|---|---|
| 4,784,924 A | 11/1988 | Savinell et al. | |
| 4,882,241 A * | 11/1989 | Heinzel | 429/107 |
| 2002/0127474 A1 * | 9/2002 | Fleischer et al. | 429/309 |

OTHER PUBLICATIONS

Mohammadi et al., Characterisation of Novel Composite Membrane for Redox Flow Battery Applications, Journal of Membrane Science 98 (1995), pp. 77-87.

Luo et al., Influences of Permeation of Vanadium Ions through PVDF-g-PSSA Membranes on Performances of Vanadium Redox Flow Batteries, J. Phys., Chem. B 2005, 109, 20310-20314.

Arora et al., Battery Separators, Chem. Rev. 2004, 104, 4419-4462.

Luo et al. Preparation and Characterization of Nafion/Speek Layered Composite Membrane and Its Application in Vanadium Redox Flow Battery, Journal of Membrane Science 325 (2008), pp. 553-558.

* cited by examiner

USE OF POROUS MEMBRANE AND COMPOSITE MEMBRANE THEREOF IN REDOX FLOW ENERGY STORAGE BATTERY

PRIORITY CLAIM

This is a U.S. national stage of application No. PCT/CN2011/076981, filed on Jul. 8, 2011. Priority is claimed on the following applications: Country: China, Application No.: 201010582470.5, Filed: Dec. 10, 2010; and Country: China, Application No.: 201010584716.2, Filed: Dec. 10, 2010, the content of which are incorporated here by reference.

FIELD OF THE INVENTION

The invention relates to one type of porous membranes and their composites for redox flow battery application, in particular for vanadium flow battery application.

BACKGROUND OF THE INVENTION

Redox flow battery being a new electrochemical energy storage technology exhibits high energy conversion efficiency, flexible design, high energy storage capacity, flexible location, deep discharge, high safety, environmental friendly and low maintenance cost compared with other energy storage techniques. A number of applications have been considered, such as renewable energy storage for wind energy, solar energy etc., Emergency Power Supply, Standby Power System, peaking shaving as well as load leveling. Vanadium flow battery (VFB) has been considered as one of the most compelling electrochemical energy storage techniques due to its features like high safety, good stability, high efficiency, life longer than 15 years and low cost.

A membrane/separator, being one of the key materials of a VFB, is employed to prevent the cross mixing of the positive and negative electrolytes and compete the current circuit by transferring protons. The proton conductivity, chemical stability and ion selectivity of the membrane can directly affect the electrochemical performance and lifetime of VFB. Therefore, the membrane should possess a number of properties, including low active species permeability (high ion selectivity), low membrane area resistance (high ion conductivity), high physicochemical stability and low cost. The membranes most commonly used in VFB are perfluorosulfonic acid polymers such as DuPont Nafion® owing to their high proton conductivity and chemical stability. However, Nafion® membranes suffer from their extremely high cost, especially exhibit the disadvantage like low ion selectivity etc. when used for the VFB, which limits their further commercialization of VFB. Therefore, to develop a membrane with high ion selectivity, high physicochemical stability and low cost is of vital importance.

Currently, the membrane developed and studied for VFB application is ion exchange membrane consisted of the polymer with ion exchange groups. The ion exchange membrane can be divided into perfluorosulfonic ion exchange membrane, fluorosulfonic ion exchange membrane and non-fluorosulfonic ion exchange membrane. Because these membranes containing fluorosulfonic showed some problems such as low ion selectivity on vanadium ions and high cost, considerable effort had been gone into the development and characterization of non-fluorosulfonic ion exchange membrane, including sulfonated polyaryletherketone, polyether sulphone and polyether sulphone etc. The ion exchange groups are to transport protons and provide a bather to vanadium ions, and the main chain of polymer is to keep their mechanical stability. For the most non-fluorosulfonic ion exchange membrane, the induction of ion exchange groups can dramatically lower the chemical stability, which limits the life-time of membrane in VFB.

The membrane separation process is a process that the components of the raw material selectively transport the membrane to separate and refresh the raw material when there is a force difference (i.e. pressure difference, concentration difference and current difference etc.) between two sides of the membrane to achieve the purpose of separation or purification. The structure of the membrane is usually porous structure. The molecules with different size can selectively transport membrane based on the porous size of the membrane to achieve the purpose of separation or purification. The membrane most commonly used in the industry is usually prepared via the phase transition. The basic method is described as follows: the polymer solution is cast on a plate (i.e. glass plate). After evaporation of a moment, if necessary, the cast was immersed into non-solvent for the polymer to form the porous membrane. Various preparation parameters in this invention can affect the morphology and performance of the prepared membranes, such as the evaporation time of solvent, the concentration of the polymer solution and co-solvent etc. Different materials can be selectively separated via controlling the condition of forming the membrane and the pore size of the membranes.

In the case of the all vanadium flow battery, the vanadium ion and proton are both existed in the form of hydrated ion. The stokes radius of the V(VI) ion is about 2.5~3A° [14]. Based on the formula of Stokes radius, it is concluded that there is an inverse relationship between the Stokes radius and the permeability parameter of the ion. However, the permeability parameter of proton [15] is far more than that of the vanadium. Therefore, the Stokes radius of the vanadium ion is far more than that of the proton.

$$R_H = \frac{k_B T}{6\pi\eta D}$$

($k_B$ is the Boltzmann constant, T is the Kelvin temperature, D is the ion permeability coefficient and $\eta$ is the solution viscosity).

Based on the different stokes radius of between vanadium ions and protons, it could be possible to make protons freely transport across membrane and vanadium ions retained, realizing the function of ion exchange membranes for the VFB. This kind of membranes can meet the need of membranes via tuning the pore size without the introduction of the ion exchange groups, giving more choices of the membranes for the VFB application.

SUMMARY OF THE INVENTION

In the view of the disadvantage of the ion exchange membrane for VFB, the invention presents a type of porous membrane and their composites for redox flow battery application, in particular for vanadium flow battery application.

The following technique method was adopted in this invention to achieve the above goal.

The application of porous membranes and their composites in redox flow battery. The said porous membranes are made of at least one type of organic high molecular weight resin.

Preferably, the organic high molecular weight resin is selected from polysulfone (PSF), polyketone, polyimide (PI), polybenzimidazole, polyvinylidene fluoride (PVDF), polyvinyl pyridine, polyacrylonitrile (PAN), polypropylene, polyethylene, polybutadiene, or cellulose acetate.

Preferably, the pore size, porosity, and thickness of said porous membrane and their composites are 0.05~100 nm, 5~90%, and 20~500 µm, respectively; the optimized pore size and porosity are 0.05~20 nm and 20~60%, respectively.

The presented porous membranes are prepared via the phase inversion.

1) the organic high molecular weight resin is dissolved in the DMSO, DMAC, NMP, DMF, or their composites; or the polymer is dissolved in the co-solvent consists of DMSO, DMAC, NMP, DMF or their composites and volatile solvent; the mixture is kept stiffing at 20~100° C. for 0.5~10 h to form the polymer solution; the weight ratio of the organic high molecular weight resin is in the range of 5~70%. The weight ratio of the volatile solvent in the mixture is in the range of 0~50%;

2) the co-solvent solution prepared by the procedure (1) is cast on a non-woven fabric or glass plate or stainless steel plate; after evaporation for 0~60 s, the plate is immersed into poor solvent of resin at −20~100° C. for 5~600 s to form the porous membranes; The morphology of membranes (e.g. pore size and pore size distribution) can be controlled via adjusting the membrane cast parameters like polymer concentration, evaporation time and the ratio solvent/none solvent therefore realize the separation of V/H and further their applications in flow batteries.

FIG. 1 shows the basic principle of the application of porous membranes in VFB. From FIG. 1, the porous membranes can ultimately isolate vanadium ions while ensure the transportation of protons via controlling the pore size.

The composite membrane is prepared via doping inorganic particles in the pores based on the porous membranes; the weight ratio of the inorganic substances is in the range of 1~30%.

The inorganic particles are $SiO_2$, $ZrO_2$, $TiO_2$, $PbO_2$, $WO_3$, $ZrPO_3$, or their combinations.

The porous membranes have a variety of preparation methods, one of the most common methods of preparation are phase inversion.

The preparation of said porous membranes is described as follows:

1) the organic high molecular weight resin is dissolved in the DMSO, DMAC, NMP, DMF, or their composites; or the polymer is dissolved in the co-solvent consists of DMSO, DMAC, NMP, DMF or their composites and volatile solvent; the mixture is kept stirring at 20~100° C. for 0.5~10 h to form the polymer solution; the weight ratio of the organic high molecular weight resin is in the range of 5~70%. The weight ratio of the volatile solvent in the mixture is in the range of 0~50%;

2) the co-solvent solution prepared by the procedure (1) is cast on a non-woven fabric or glass plate or stainless steel plate; after evaporation for 0~60 s, the plate is immersed into poor solvent of resin at −20~400° C. for 5~600 s to form the porous membranes;

(3) the porous membranes prepared by the procedure (2) are immersed into the inorganic soluble precursor solution. The weight ratio of precursor solution is in the range of 5~100%;

(4) the resulted porous membranes are immersed into the sulfuric acid or phosphoric acid for more than 1 h to form organic doping porous membranes with acid absorbed; the concentration of the sulfuric acid solution is in the range of 1~16M.

Preferably, the soluble precursor is selected from tetraethyl orthosilicate, tetramethoxysilane (TEOS), tetrabutyl titanate (TBT), Ethoxy lead, Alkoxy tungsten, zirconium oxychloride, or Tetrabutyl oxygen zirconium; the volatile solvent is selected from methanol, tetrahydrofuran, n-hexane or their composites; the poor solvent for resin is selected from water, methanol, alcohol, propanol, isopropanol, or their composites.

The composite membrane is prepared via grafting ion exchange groups on the surface or pores of the porous membrane; the weight ratio of ion exchange groups in the composite membranes is 0.1~30%.

Preferably, the ion exchange groups are sulfonated polystyrene group or amination polystyrene group.

Said ion exchange groups grafted porous composite membranes are prepared via the following phase inversion method:

the preparation of the porous membrane is similar to the procedure (1) and (2) of the above preparation;

Take PVDF for instance:

(3) the porous membranes prepared by the procedure (2) are immersed into KOH alcoholic solution at −10~80° C. for 1~10 h;

(4) the membranes prepare by the procedure (3) are immersed into the mixed solution consisting of polystyrene (PS) and THF at −15~60° C. for 0.5~10 h;

(5) the resulted membranes prepared by the procedure (4) are immersed into sulfonating agent at 0~100° C. for 0.5~10 h to form grafted porous composites membranes; or the resulted membranes prepared by the procedure (4) are immersed into chloromethylation reagent at −20~100° C. for 0.5~20 h; afterward, the membranes are immersed into 5~60 wt % TMA aqueous solution for 2~48 h to form grafted porous composite porous membranes.

Preferably, the volatile non-solvent is selected from methanol, tetrahydrofuran, n-hexane or their composites; the poor solvent for resin is selected from water, methanol, alcohol, propanol, isopropanol, or their composites.

Preferably, the concentration of KOH alcoholic solution is in the range of 1~10%.

Preferably, the weight ratio of PS aqueous solution is in the range of 1~90%. Preferably, the sulfonating reagent is selected from 95~98% $H_2SO_4$, chlorosulfonic acid, fuming sulphuric acid, sulphite, or their composites.

Preferably, the chloromethylation reagent is selected from chloromethyl ether, Dibemethine, Chlorine methyl alkyl ether, (HCHO)n-HCl, or their composites.

Preferably, the presented aminomethylating reagent is selected from trimethylamine, triethylamine, dimethylamine, diethylamine, or their composites.

This type of membrane can also be prepared via the drawing method except for the presented phase inversion method.

The presented porous membranes can be used for redox flow batteries. The presented redox flow batteries include all vanadium flow battery, $NaS_x$/Br flow battery, Fe/Cr flow battery, V/Br flow battery, Zn/Ce flow battery, or Fe/Cr flow battery and in no way intended to limitative of these flow batteries.

ADVANTAGES OF THE INVENTION

1. This invention relates to the porous membrane for the redox flow battery application. Separation and transport of various ions can be carried out via controlling pore size of the membranes. This kind of membranes kept the ion selective permeability without the introduction of any ion exchange groups and met the need of ion exchange membrane for redox flow battery. This type of membranes avoided the low chemical stability caused by the induction of ion exchange groups.

2. The pore size and structure of the composite membranes in this invention can be further tuned via inorganic doping to enhance the membrane vanadium ion rejection and proton conductivity, which hence increases the membrane vanadium/proton selectivity and ion conductivity.

3. The ion exchange groups grafted porous composite membrane can be prepared via grafting sulfonated polystyrene group or amination polystyrene group on the pores of porous membranes. This type of membranes cannot only tune the wettability for the electrolytes, but also further decrease the pore size, which can decrease the membrane area resistance. Thus this type of membranes exhibited high ion conductivity and high ion selective permeability. This kind of membranes with low cost and good chemical stability is suitable for the separators of the redox flow battery.

4. This type of membrane with tunable pore size and low cost can be easily made and up scaled.

5. This invention gives more selection of membrane for the redox flow battery.

6. This invention can effectively control the efficiency of the redox flow battery.

DETAILED DESCRIPTION OF THE INVENTION

The following examples are intended to be merely exemplary and in no way intended to be limitative of the subject invention.

Example 1

7.5 g PAN was dissolved in 50 mL DMSO and kept stirring for 5 h to form the polymer solution. The polymer solution was cast on a glass plate, immediately immersed into 5 L water and solidified for 5 min to form the porous membrane with the thickness of 500 μm.

Figure 1:
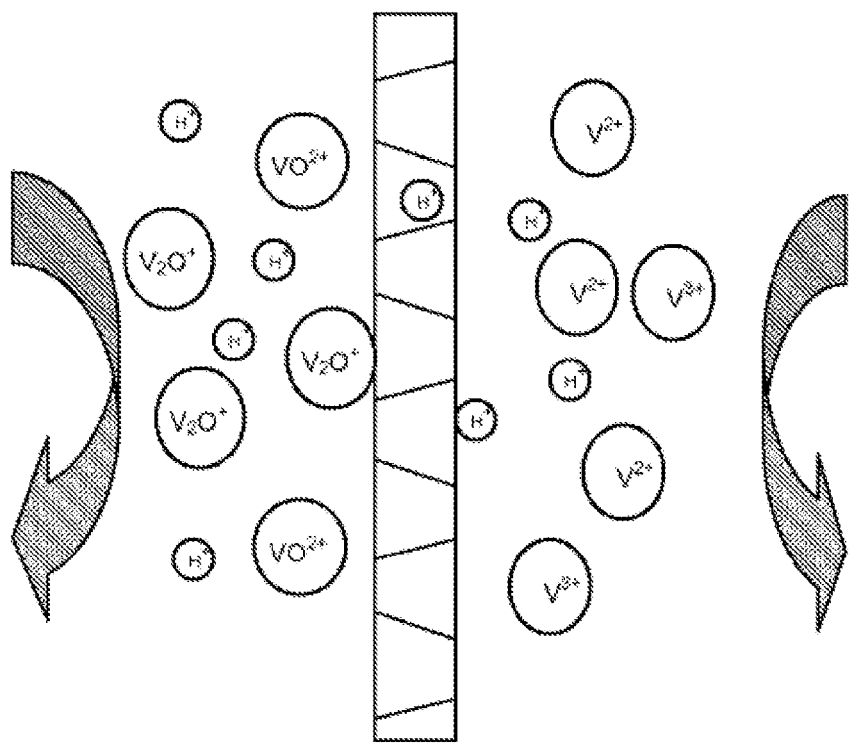
FIG. 1 shows the schematic principle of porous membrane in VFB.
Figure 2:
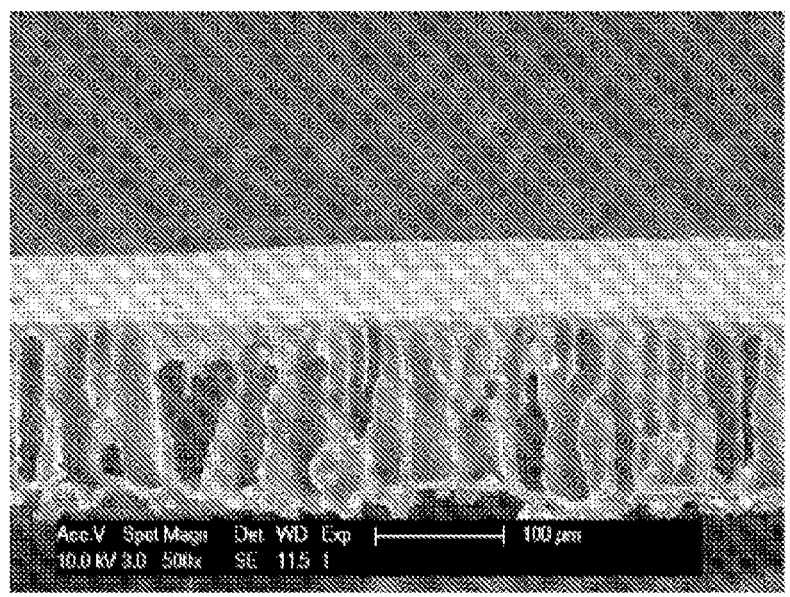
FIG. 2 shows the cross morphology of membranes prepared according to Example 1.

The cross-section morphology of the prepared membrane showed uniformly porous structure, as given in FIG. 2. The membrane was fabricated in a VRB single cell with carbon felt electrodes and graphite current collectors. The concentrations of vanadium ions and H$_2$SO$_4$ in the electrolyte solution were 3 M. The efficient area of the membrane was 9 cm$^2$ and the testing current density was 80 mA cm$^2$. The coulombic efficiency (CE), voltage efficiency (VE) and energy efficiency (EE) were 66.1%, 81.1% and 53.6%, respectively.

Example 2

7.5 g PAN was dissolved in the mixed solvent consisting of 30 mL DMSO and 20 mL THF and kept stirred for 5 h to form the polymer solution. The polymer solution was cast on a glass plate. After evaporation for 10 s, the plate was immediately immersed into 5 L water and solidified for 10 min to form the porous membrane with the thickness of 500 μm.

The membrane was fabricated in a VRB single cell with carbon felt electrodes and graphite current collectors. The efficient area of the membrane was 9 cm$^2$ and the testing current density was 80 mA cm$^{-2}$. The concentrations of vanadium ions and H$_2$SO$_4$ in the electrolyte solution were 1.5 M and 3 M respectively. The coulombic efficiency (CE), voltage efficiency (VE) and energy efficiency (EE) were 80.7%, 82.1% and 66.2%, respectively.

Example 3

7.5 g PAN was dissolved in the mixed solvent consisting of 30 mL DMSO and 20 mL THF and kept stirred for 5 h to form the polymer solution. The polymer solution was cast on a glass plate. After evaporation for 20 s, the plate was immediately immersed into 5 L water and solidified for 10 min to form the porous membrane with the thickness of 500 μm.

The membrane was fabricated in a VRB single cell with carbon felt electrodes and graphite current collectors. The efficient area of the membrane was 9 cm$^2$ and the testing current density was 80 mA cm$^{-2}$. The concentrations of vanadium ions and H$_2$SO$_4$ in the electrolyte solution were 1.5 M and 3 M respectively. The coulombic efficiency (CE), voltage efficiency (VE) and energy efficiency (EE) were 91.8%, 81.5% and 75%, respectively.

Figure 3:
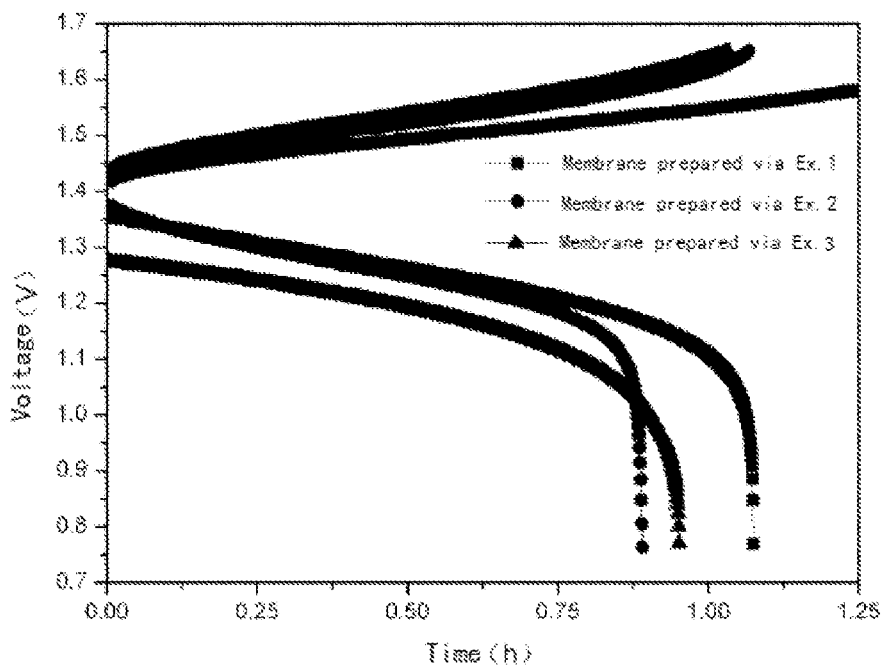
FIG. 3 shows the charge/discharge curve of VFB assembled with the membranes prepared according to Example 1, 2 and 3.
Figure 4:
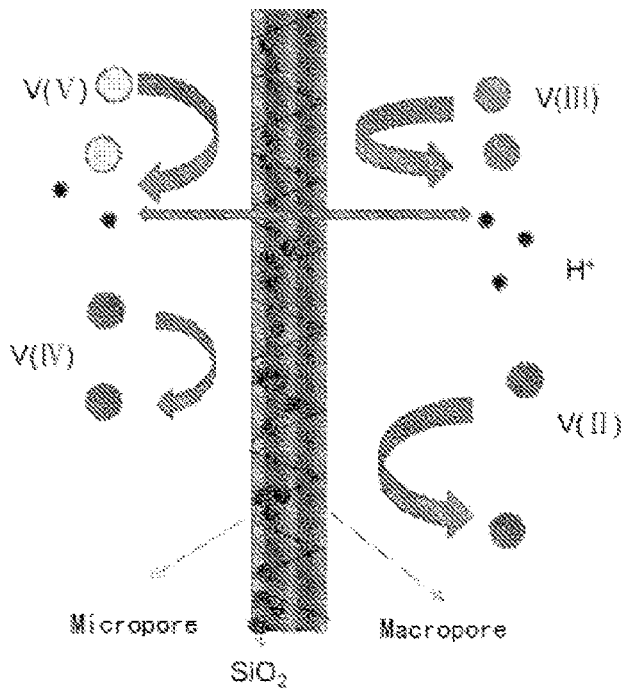
FIG. 4 shows the schematic principle of inorganic doping porous composite membranes in VFB

Seen from the single cell performance of Example 1, 2 and 3 given in FIG. 3, as the pore size of membrane decreases, the CE increases, the EE keep the same value and hence the EE also increases. Thus, the ion selectivity can increase with the decreased porous size, which dramatically increases the coulombic efficiency of the VFB.

Example 4

The preparation method of PSF porous membrane was similar to Example 1 except: 1) the polymer was alternated to PSF. 2) the solvent was alternated to NMP.

Example 5

The preparation method of PI porous membrane was similar to Example 1 except: 1) the polymer was alternated to PI. 2) the solvent was alternated to NMP.

Example 6

Figure 5:
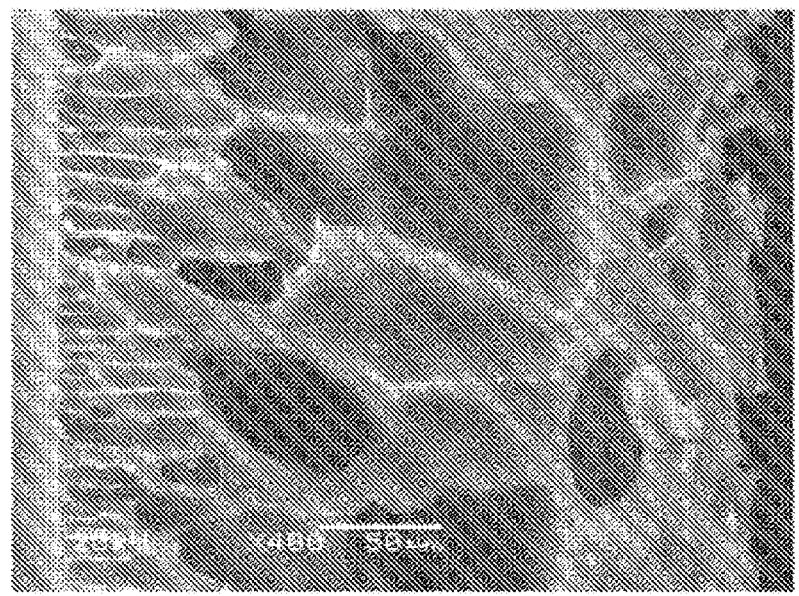
FIG. 5 shows the SEM picture of the composite membranes prepared according to Example 6.
Figure 6:
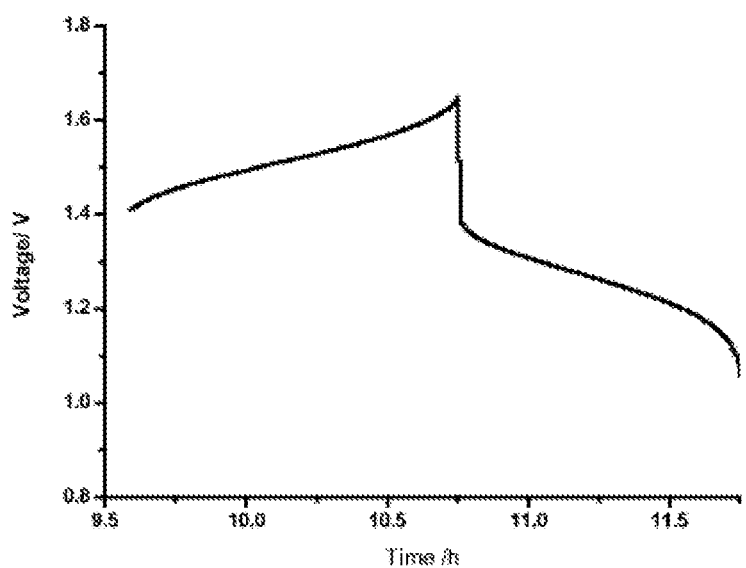
FIG. 6 shows the charge/discharge curve of the membrane prepared according to Example 6 in VFB under a current density of 80 mA/cm$^2$.
Figure 7:
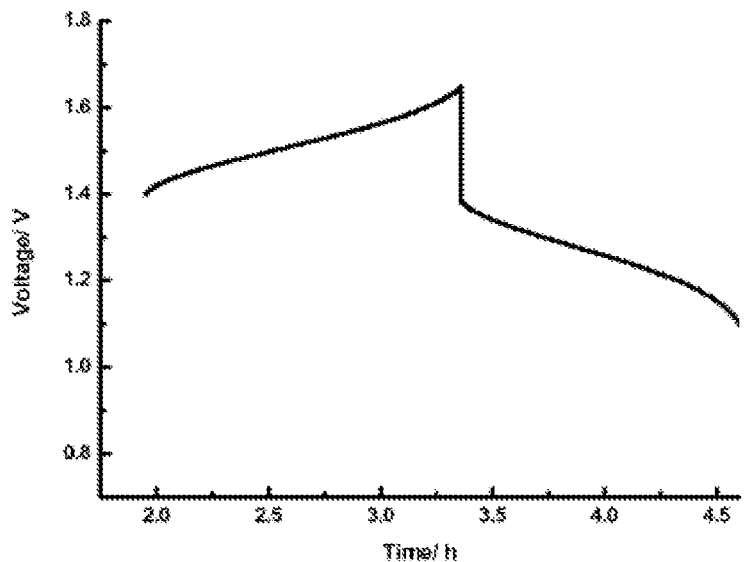
FIG. 7 shows the charge/discharge curve of the membrane prepared according to Example 7 in VFB under a current density of 80 mA/cm$^2$.
Figure 8:
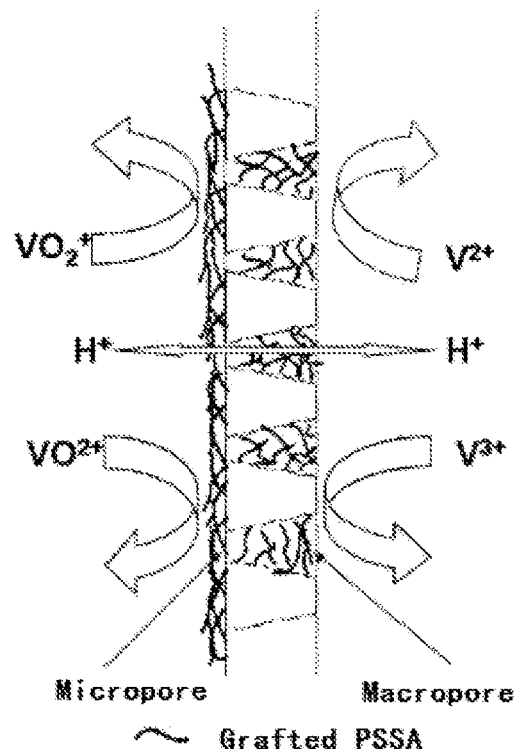
FIG. 8 shows the schematic principle of ion exchange group grafting porous composite membranes in VFB.
Figure 9:
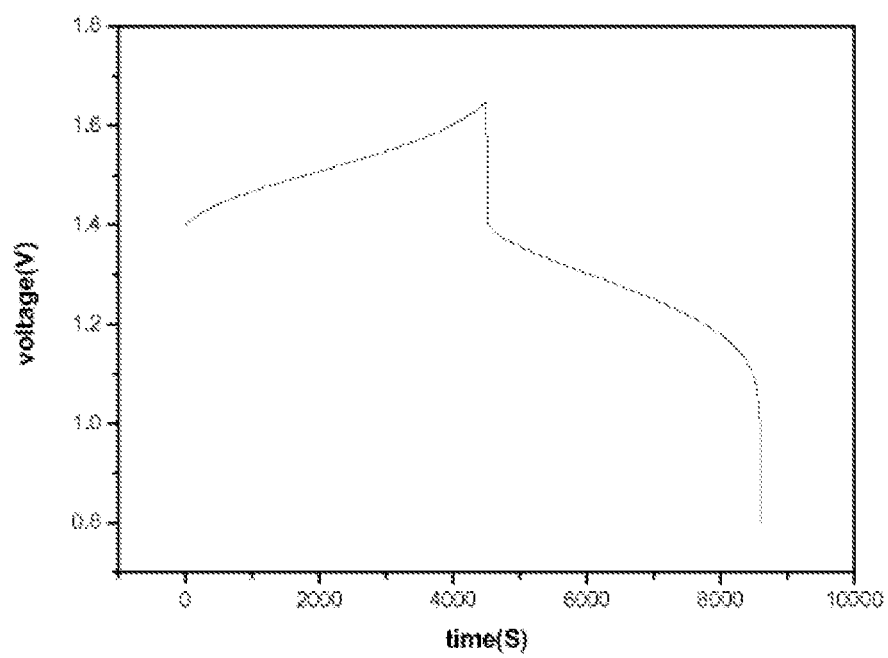
FIG. 9 shows the charge/discharge curve of the composite membrane prepared according to Example 8 in VFB under a current density of 80 mA/cm$^2$.

7.5 g PAN was dissolved in 50 ML DMSO and kept stirring for 5 h to form the polymer solution. The polymer solution was cast on a glass plate, immediately immersed in 5 L water and solidified to form the porous membrane. The cross-section morphology of the membrane determined via SEM showed the uniformly porous structure, as given in FIG. 5.

The prepared membrane was immersed into deionized water for 1 h, and then immersed into TEOS for 2 h to obtain the silica modified porous membrane. Afterward, the porous blend membrane was dried at 60° C. for 6 h. Finally, the porous blend membrane was immersed into 1M $H_2SO_4$ for 24 h.

The membrane was fabricated in a VRB single cell with carbon felt electrodes and graphite current collectors. The concentrations of vanadium ions and $H_2SO_4$ in the electrolyte solution were 1.5 M and 3 M, respectively. The efficient area of the membrane was 9 $cm^2$ and the testing current density was 80 mA $cm^{-2}$. The coulombic efficiency (CE), voltage efficiency (VE) and energy efficiency (EE) were 92%, 81.5% and 75%, respectively.

Compared with Example 1, the silica modified PAN porous blend membrane exhibited higher CE and EE. This result suggested that the existence of silica can effectively increase the ion selectivity, decrease the membrane internal resistance, and as a result increase the energy efficiency of the VFB.

Example 7

13.5 g PSF and 1.5 g SPEEK were dissolved in 45 g and kept stirring for 5 h to form the polymer solution. The polymer solution was cast on a glass plate, immediately immersed in 5 L water and solidified for 1 h to form the porous membrane.

The prepared membrane was immersed into deionized water for 1 h, and then immersed into for 2 h to obtain the silica modified porous blend membrane. Afterward, the porous membrane was dried at 60° C. for 6 h. Finally, the porous membrane was immersed into 1M $H_2SO_4$ for 24 h.

The membrane was fabricated in a VRB single cell with carbon felt electrodes and graphite current collectors. The concentrations of vanadium ions and $H_2SO_4$ in the electrolyte solution were 1.5 M and 3 M, respectively. The efficient area of the membrane was 9 $cm^2$ and the testing current density was 80 mA $cm^{-2}$. The coulombic efficiency (CE), voltage efficiency (VE) and energy efficiency (EE) were 97%, 79.4% and 77%, respectively.

Comparative Example 1

The preparation method of membrane was similar to Example 2 except that the membrane was alternated to PES/SPEEK porous blend membrane without silica doping. The coulombic efficiency (CE), voltage efficiency (VE) and energy efficiency (EE) were 86.8%, 82.4% and 71.5%, respectively. The silica doping PES/SPEEK porous blend membrane showed the increased CE and EE compared with this membrane. This result suggested the induction of silica can increase the ion selectivity, and thereby increase the EE of VFB.

Example 8

9 g PVDF was dissolved in 50 mL DMF and kept stirring for 5 h to form the polymer solution. The polymer solution was cast on a glass plate, immediately immersed into 5 L water and solidified to form the porous membranes.

The prepared porous membrane was immersed into deionized water for 1 h. And then immersed into 4 wt % KOH alcoholic solution at 80° C. for 45 min. Afterward, the porous membrane was immersed into the mixed solution consisting of PS and THF (the volume ratio of PS to THF was 4 to 1) at 80° C. for 12 h. Finally, the porous membrane was washed with chloroform sulfonated in 98% wt $H_2SO_4$ at 70° C. for 1 h. The membrane was fabricated in a VRB single cell with carbon felt electrodes and graphite current collectors. The concentrations of vanadium ions and $H_2SO_4$ in the electrolyte solution were 1.5 M and 3 M, respectively. The efficient area of the membrane was 9 $cm^2$ and the testing current density was 80 mA $cm^{-2}$. The coulombic efficiency (CE), voltage efficiency (VE) and energy efficiency (EE) were 91%, 83% and 75.5%, respectively.

Example 9

9 g PVDF was dissolved in 50 ml DMF and kept stirring for 5 h to form the polymer solution. The resulted solution was cast on a glass plate, immediately immersed into 5 L water and solidified to form the porous membrane.

The prepared porous membrane was immersed into deionized water for 1 h. And then the porous membrane was immersed into the 4% wt KOH alcoholic solution at 80° C. for 45 min. Afterward, the porous membrane was immersed into the mixed solution consisting of PS and THF (the volume ratio of PS to THF is 4 to 1) at 80° C. for 12 h. Finally, the porous membrane was washed with chloroform and sulfonated in 98% wt $H_2SO_4$ at 70° C. for 2 h to get the porous membrane with the sulfonate degree more than the membrane prepared by the example 8.

Example 10

12 g PVDF was dissolved in 50 ml DMF and kept stirring for 5 h to form the polymer solution. The resulted solution was cast on a glass plate, immediately immersed into 5 L water and solidified to form the porous membrane.

The prepared porous membrane was immersed into deionized water for 1 h. Afterward, the porous membrane was immersed into the 4% wt KOH alcoholic solution at 80° C. for 45 min. The porous membrane was then immersed into the mixed solution consisting of PS and THF (the volume ratio of PS to THF is 4 to 1) at 80° C. for 12 h. Finally, the porous membrane was washed with chloroform and sulfonated in 98% wt $H_2SO_4$ at 70° C. for 1 h to get the porous membrane with the pore size less than the membrane prepared by the example 8.

Example 11

9 g PVDF was dissolved in 50 ml DMF and kept stirring for 5 h to form the polymer solution. The resulted solution was cast on a glass plate, immediately immersed into 5 L water and solidified to form the porous membrane.

The prepared porous membrane was immersed into deionized water for 1 h. The porous membrane was immersed into the 4% wt KOH alcoholic solution at 80° C. for 45 min. The porous membrane was then immersed into the mixed solution consisting of PS and THF (the volume ratio of PS to THF was 4 to 1) at 80° C. for 12 h. Afterward, the porous membrane was washed with chloroform and immersed into the 10 wt % CME/dichloroethane solution at 50° C. for 12 h. Finally, the porous membrane was immersed into the 40 wt % TMA aqueous solution for 10 h to get the PVDF porous membrane with amination PS grafted on the pores.

Comparative Example 2

The preparation method of membrane was similar to Example 8 except the membrane was alternated to the plain PVDF porous membrane. The charge/discharge process cannot be carried out due to the internal resistance. The grafted PVDF porous membrane showed the decreased internal resistance compared with the pristine PVDF porous membrane.

We claim:

1. A redox flow battery comprising a porous membrane or a composite membrane, wherein said porous membranes is made of at least one organic high molecular weight resin selected from the group consisting of polysulfone (PSF), polyketone, polyimide (PI), polybenzimidazole, polyvinylidene fluoride (PVDF), polyvinyl pyridine, polyacrylonitrile (PAN), polypropylene, polyethylene, polybutadiene, and cellulose acetate, said composite membrane is prepared via doping inorganic particles in the pores of the porous membrane, the pore size, porosity, and thickness of said porous membrane and composite membrane are 0.05~20 nm, 20~60%, and 20~500 μm, respectively, said porous membrane and composite membrane are free of ion exchange groups, and said redox flow battery is a vanadium flow battery.

2. The battery of claim 1, wherein said composite membrane is prepared via doping inorganic particles in the pores based on the porous membranes; the weight ratio of the inorganic substances is in the range of 1~30%.

3. The battery of claim 2, wherein the inorganic particles are $SiO_2$, $ZrO_2$, $TiO_2$, $PbO_2$, $WO_3$, $ZrPO_3$, or their combinations.

4. A method of making a porous composite membrane, via grafting an ion exchange group on the surface or pores of a PVDF porous membrane, wherein the ion exchange group is a sulfonated polystyrene group or an aminated polystyrene group, the amount of the ion exchange group is 0.1~30% based on the total weight of the porous composite membrane, the thickness, pore size and porosity of said porous composite membrane are 20~500 μm 0.05~20 nm, and 20~60%, respectively, and the method comprises the following steps:

(1) PVDF is dissolved in an organic solvent and kept stirring at 20~100° C. for 0.5~10 h to form a polymer solution; the amount of the PVDF is in the range of 5~70% based on the total weight of the polymer solution;

a volatile solvent is optionally added into said organic solvent to form a mixture, the amount of the volatile solvent is in the range of 0~50% based on the total weight of the mixture;

(2) the polymer solution prepared by step (1) is cast on a non-woven fabric or a glass substrate; after evaporation for 0~60 s, the substrate is immersed into a poor solvent for resin at −20~100° C. for 5~600 s to form the porous membrane with a thickness of 20~500 μm;

(3) the membrane prepared by step (2) are immersed into a KOH alcoholic solution at −10~80° C. for 1~10 h;

(4) the membrane prepared by step (3) is immersed into a PS THF's solution at −15~60° C. for 0.5~60 h;

(5) the membrane prepared by step (4) is immersed into a sulfonating reagent at 0~100° C. for 0.5~10 h to form the porous membrane;

or, in the alternative, the membrane prepared by step (4) is immersed into a chloromethylation reagent at −20~100° C. for 0.5~20 h, and the resulted membrane is immersed into a 5~60 wt % TMA aqueous solution for 2~48 h to form to PVDF porous membrane;

said sulfonating reagent is selected from the group consisting of 95~98% $H_2SO_4$, chlorosulfonic acid, fuming sulphuric acid, sulphite, and combinations thereof;

said chloromethylation reagent is selected from the group consisting of chloromethyl ether, dibemethine, chlorine methyl alkyl ether, (HCHO)n-HCl, and combinations thereof; said aminomethylating reagent is selected from the group consisting of trimethylamine, triethylamine, dimethylamine, diethylamine, and combinations thereof;

said organic solvent is selected from the group consisting of DMSO, DMAC, NMP, DMF, and combinations thereof; said volatile non-solvent is selected from the group consisting of methanol, tetrahydrofuran, n-hexane, and combinations thereof; said poor solvent for polymer is selected from the group consisting of water, methanol, alcohol, propanol, isopropanol, and combinations thereof;

the concentration of said KOH alcoholic solution is in the range of 1~10 wt %; and the concentration of said styrene solution is in the range 1~90 wt %.

* * * * *